US011915633B2

(12) United States Patent
Liang et al.

(10) Patent No.: US 11,915,633 B2
(45) Date of Patent: Feb. 27, 2024

(54) SCREEN COLOR TEMPERATURE CONTROL METHOD, APPARATUS, STORAGE MEDIUM, AND MOBILE TERMINAL

(71) Applicant: HUIZHOU TCL MOBILE COMMUNICATION CO., LTD, Guangdong (CN)

(72) Inventors: Bin Liang, Guangdong (CN); Sheng Zhang, Guangdong (CN)

(73) Assignee: HUIZHOU TCL MOBILE COMMUNICATION CO., LTD, Huizhou (CN)

( * ) Notice: Subject to any disclaimer, the term of this patent is extended or adjusted under 35 U.S.C. 154(b) by 0 days.

(21) Appl. No.: 17/807,816

(22) Filed: Jun. 20, 2022

(65) Prior Publication Data

US 2022/0319378 A1 Oct. 6, 2022

Related U.S. Application Data

(63) Continuation of application No. PCT/CN2020/076095, filed on Feb. 21, 2020.

(30) Foreign Application Priority Data

Dec. 20, 2019 (CN) ......................... 201911325069.0

(51) Int. Cl.
*G09G 3/20* (2006.01)

(52) U.S. Cl.
CPC ... *G09G 3/2003* (2013.01); *G09G 2320/0666* (2013.01); *G09G 2320/103* (2013.01); *G09G 2360/144* (2013.01)

(58) Field of Classification Search
CPC ..... G09G 2320/0666; G09G 2320/103; G09G 2360/144; G09G 3/2003
See application file for complete search history.

(56) References Cited

U.S. PATENT DOCUMENTS

| | | | | |
|---|---|---|---|---|
| 9,678,653 | B1 * | 6/2017 | Manyam | G09G 3/344 |
| 2005/0212824 | A1 * | 9/2005 | Marcinkiewicz | G09G 3/3406 345/690 |

(Continued)

FOREIGN PATENT DOCUMENTS

| | | | |
|---|---|---|---|
| CN | 104345876 | A | 2/2015 |
| CN | 105355188 | A | 2/2016 |

(Continued)

OTHER PUBLICATIONS

International Search Report in International application No. PCT/CN2020/076095, dated Sep. 9, 2020.

(Continued)

*Primary Examiner* — Kenneth Bukowski
(74) *Attorney, Agent, or Firm* — PV IP PC; Wei Te Chung; Zhigang MA

(57) ABSTRACT

Embodiments of the present disclosure is directed to a method of controlling screen color temperature. The method includes: acquiring ambient light parameters according to a preset time interval, obtaining an ambient relative color temperature value corresponding to the ambient light parameter acquired at each acquisition time point, performing a weighted average process on the ambient relative color temperature value corresponding to the ambient light parameter acquired at each acquisition time point to obtain a target ambient color temperature value, determining a target screen color temperature value corresponding to the target ambient color temperature value and further a current screen color temperature value, and changing a color temperature value of the screen from the current screen color temperature value to the target screen color temperature value according to the screen color temperature value change time.

8 Claims, 3 Drawing Sheets

(56) References Cited

U.S. PATENT DOCUMENTS

| | | | | |
|---|---|---|---|---|
| 2014/0368483 | A1* | 12/2014 | Zhang | G09G 3/3611 345/207 |
| 2018/0005588 | A1 | 1/2018 | Kurokawa | |
| 2018/0090045 | A1* | 3/2018 | Li | G09G 3/2003 |

FOREIGN PATENT DOCUMENTS

| | | | |
|---|---|---|---|
| CN | 105469775 | A | 4/2016 |
| CN | 105869603 | A | 8/2016 |
| CN | 106251831 | A | 12/2016 |
| CN | 106357918 | A | 1/2017 |
| CN | 106713654 | A | 5/2017 |
| CN | 107343143 | A | 11/2017 |
| CN | 107919105 | A | 4/2018 |
| CN | 108154865 | A | 6/2018 |
| CN | 109408018 | A | 3/2019 |
| CN | 109558100 | A | 4/2019 |
| CN | 109842723 | A | 6/2019 |
| CN | 109872705 | A | 6/2019 |
| CN | 110035176 | A | 7/2019 |
| EP | 0863677 | A | 9/1998 |
| JP | 2014216963 | A | 11/2014 |
| JP | 2017213989 | A | 12/2017 |

OTHER PUBLICATIONS

Written Opinion of the International Search Authority in International application No. PCT/CN2020/076095, dated Sep. 9, 2020.

Notification to Grant Patent Right for Invention issued in corresponding Chinese Patent Application No. 201911325069.0 dated Feb. 25, 2021, pp. 1-4.

Chinese Office Action issued in corresponding Chinese Patent Application No. 201911325069.0 dated Aug. 26, 2020, pp. 1-8.

* cited by examiner

SCREEN COLOR TEMPERATURE CONTROL METHOD, APPARATUS, STORAGE MEDIUM, AND MOBILE TERMINAL

CROSS REFERENCE TO RELATED APPLICATION

This application is a continuation application of an International Application No. PCT/CN2020/076095, filed on Feb. 21, 2020, which claims the priority of Chinese Patent Application No. 201911325069.0, entitled "SCREEN COLOR TEMPERATURE CONTROL METHOD, APPARATUS, STORAGE MEDIUM, AND MOBILE TERMINAL", filed on Dec. 20, 2019, the disclosure of which is incorporated herein by reference in its entirety.

FIELD OF THE DISCLOSURE

The present disclosure relates to a field of communication technology, and in particular, to a screen display driving circuit and a display driving device.

BACKGROUND

In recent years, mobile terminals such as mobile phones and tablet computers have gradually been favored by users because of their portability. Users interact with the mobile terminals by watching the screens on the mobile terminals. When users rely more and more on electronic products, it will also cause a huge impact on the eyes. Take the case of great scene switching as an example, for example, when watching a TV series in a dark scene at night and then the surrounding scene suddenly brightens after the lights are turned on, the screen displaying color temperature of the mobile terminal will be directly adjusted to a larger parameter, which causes the screen to become brighter directly from dark, but the human eyes have not yet adapted, causing damage to the human eyes from the screen.

SUMMARY

The embodiment of the present disclosure provides a screen color temperature control method, which can avoid that a screen color temperature of a mobile terminal is directly adjusted to a larger or smaller parameter when the scene switching is great, so as to prevent the human eyes from be damaged by the screen.

According to a first aspect, an embodiment of the present disclosure provides a screen color temperature control method comprising:

- acquiring ambient light parameters according to a preset time interval;
- obtaining an ambient relative color temperature value corresponding to the ambient light parameter acquired at each acquisition time point;
- performing a weighted average process on the ambient relative color temperature value corresponding to the ambient light parameter acquired at each acquisition time point to obtain a target ambient color temperature value;
- determining a target screen color temperature value corresponding to the target ambient color temperature value and further a current screen color temperature value;
- obtaining a screen color temperature value change time according to the target screen color temperature value and the current screen color temperature value and changing a color temperature value of the screen from the current screen color temperature value to the target screen color temperature value according to the screen color temperature value change time.

According to second aspect, an embodiment of the present disclosure provides a screen color temperature control device comprising:

- an acquisition unit configured to acquire ambient light parameters according to a preset time interval;
- a first obtaining unit configured to obtain an ambient relative color temperature value corresponding to the ambient light parameter acquired at each acquisition time point; a weighted average unit configured to perform a weighted average process on the ambient relative color temperature value corresponding to the ambient light parameter acquired at each acquisition time point to obtain a target ambient color temperature value;
- a determination unit configured to determine a target screen color temperature value corresponding to the target ambient color temperature value and further a current screen color temperature value;
- a second obtaining unit configured to obtain a screen color temperature value change time according to the target screen color temperature value and the current screen color temperature value and change a color temperature value of the screen from the current screen color temperature value to the target screen color temperature value according to the screen color temperature value change time.

According to a third aspect, an embodiment of the present disclosure provides a storage medium where a computer program is stored. When the computer program is run on the computer, the computer performs the screen color temperature control method as described above.

According to a fourth aspect, an embodiment of the present disclosure provides a mobile terminal. The mobile terminal comprises a processor and a memory. The memory stores a computer program. The processor performs a screen color temperature control method by calling the computer program stored in the memory. The method includes:

- acquiring ambient light parameters according to a preset time interval;
- obtaining an ambient relative color temperature value corresponding to the ambient light parameter acquired at each acquisition time point;
- performing a weighted average process on the ambient relative color temperature value corresponding to the ambient light parameter acquired at each acquisition time point to obtain a target ambient color temperature value; and
- determining a target screen color temperature value corresponding to the target ambient color temperature value and further a current screen color temperature value; and
- obtaining a screen color temperature value change time according to the target screen color temperature value and the current screen color temperature value and changing a color temperature value of the screen from the current screen color temperature value to the target screen color temperature value according to the screen color temperature value change time, wherein the ambient light parameters comprise RGB color and RGB transparency of the ambient light in an environment where the mobile terminal is located.

Furthermore, the performing a weighted average process on the ambient relative color temperature value corresponding to the ambient light parameter acquired at each acquisition time point to obtain a target ambient color temperature value comprises:

performing a weighted average process on the ambient relative color temperature value corresponding to the ambient light parameter acquired at each acquisition time point to obtain a current ambient color temperature value;

obtaining a target historical ambient color temperature value closest to a current time, wherein the historical ambient color temperature value is obtained by performing a weighted average process on the ambient relative color temperature value corresponding to the ambient light parameter acquired at each historical acquisition time point;

multiplying the target historical ambient color temperature value by a first fixed value and a second fixed value respectively to obtain a first target historical ambient color temperature threshold value and a second target historical ambient color temperature threshold value;

determining the target ambient color temperature value based on the current ambient color temperature value, the first target historical ambient color temperature threshold value, and the second target historical ambient color temperature threshold value.

Furthermore, the determining the target ambient color temperature value based on the current ambient color temperature value, the first target historical ambient color temperature threshold value, and the second target historical ambient color temperature threshold value comprises:

determining the first target historical ambient color temperature threshold value as the target ambient color temperature value if the current ambient color temperature value is less than the first target historical ambient color temperature threshold value.

Furthermore, the determining the target ambient color temperature value based on the current ambient color temperature value, the first target historical ambient color temperature threshold value, and the second target historical ambient color temperature threshold value comprises:

determining the second target historical ambient color temperature threshold value as the target ambient color temperature value if the current ambient color temperature value is greater than the second target historical ambient color temperature threshold value.

Furthermore, the determining the target ambient color temperature value based on the current ambient color temperature value, the first target historical ambient color temperature threshold value, and the second target historical ambient color temperature threshold value comprises:

determining the current ambient color temperature value as the target ambient color temperature value if the current ambient color temperature value is greater than the first target historical ambient color temperature threshold value and less than the second target historical ambient color temperature threshold value.

The screen color temperature control method provided by the embodiments of the present disclosure includes: acquiring ambient light parameters according to a preset time interval; obtaining an ambient relative color temperature value corresponding to the ambient light parameter acquired at each acquisition time point; performing a weighted average process on the ambient relative color temperature value corresponding to the ambient light parameter acquired at each acquisition time point to obtain a target ambient color temperature value; determining a target screen color temperature value corresponding to the target ambient color temperature value and further a current screen color temperature value; and obtaining a screen color temperature value change time according to the target screen color temperature value and the current screen color temperature value and changing a color temperature value of the screen from the current screen color temperature value to the target screen color temperature value according to the screen color temperature value change time. The present disclosure can avoid that a screen color temperature of a mobile terminal is directly adjusted to a larger or smaller parameter when the scene switching is great, so as to prevent the human eyes from be damaged by the screen.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

Figure 1:
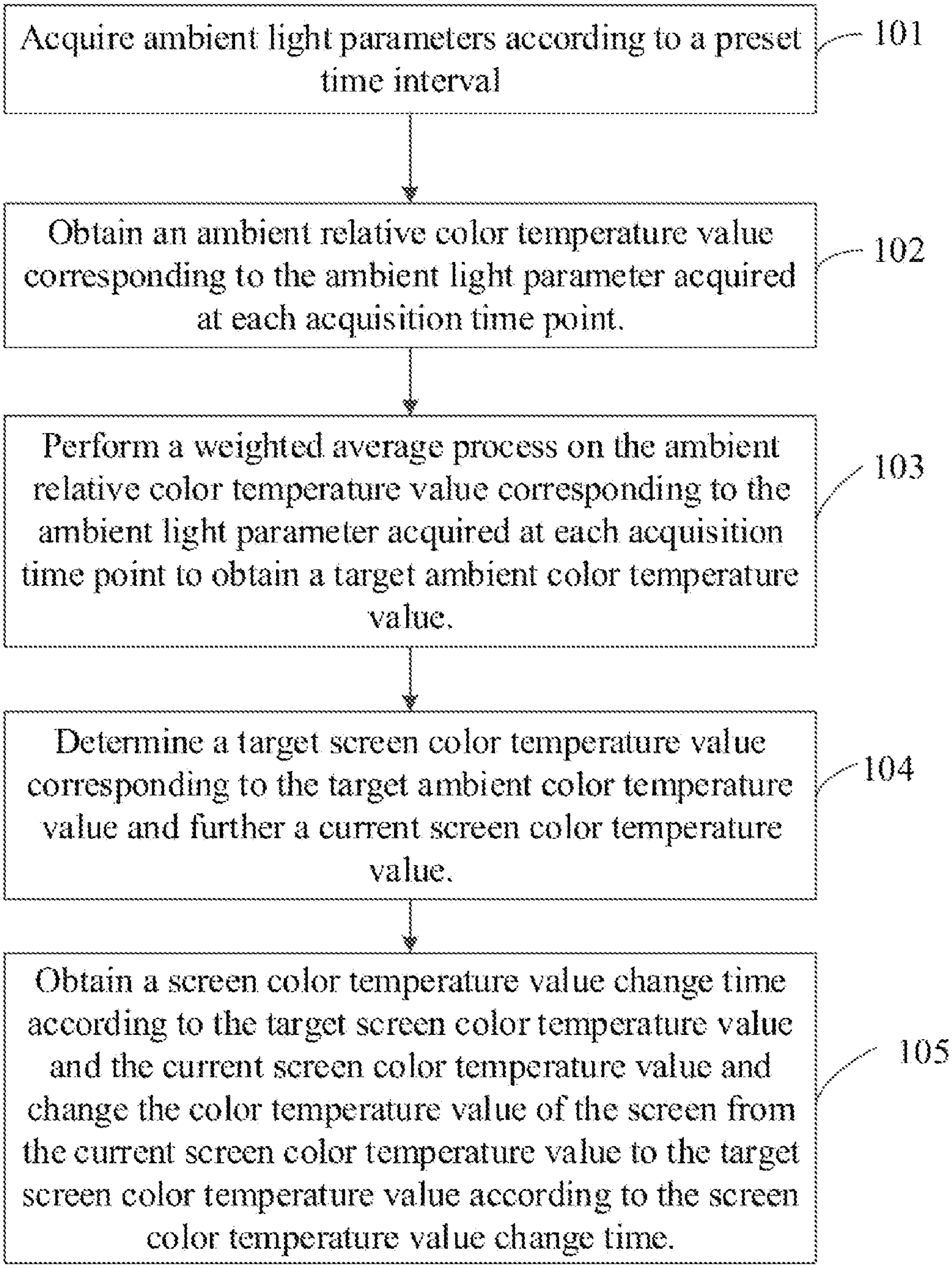
FIG. 1 is a first schematic flow chart of a screen color temperature control method according to an embodiment of the present disclosure.

The disclosure is described below in detail with reference to the accompanying drawings, wherein like reference numerals are used to identify like elements illustrated in one or more of the figures thereof, and in which exemplary embodiments of the disclosure are shown. This disclosure may, however, be embodied in many different forms and should not be construed as limited to the particular embodiments set forth herein. Rather, these embodiments are provided so that this disclosure will be thorough and complete, and will fully convey the scope of the disclosure to those skilled in the art.

Please refer to FIG. 1, FIG. 1 is a first schematic flow chart of a screen color temperature control method provided by an embodiment of the present disclosure. The screen color temperature control method comprises:

Step 101: acquiring ambient light parameters according to a preset time interval.

The ambient light parameters can be acquired by an RGB sensor on a mobile terminal, wherein the mobile terminal can be a mobile phone, a tablet computer, a notebook computer, a personal digital assistant, and other devices, and a variety of application programs are stored in the mobile terminal, such as applications with entertainment functions (such as video applications, screen color temperature control applications, game applications, reading software) and applications with service functions (such as map navigation applications, catering applications, etc.).

Specifically, the ambient light parameters may comprise parameters such as RGB color and RGB transparency of the ambient light in the environment where the mobile terminal is located, which the application is not limited to. The preset time interval may be 100 ms, 50 milliseconds (ms), etc., so as to acquire the ambient light parameters in the environment where the mobile terminal is located at multiple times.

Step 102: obtaining an ambient relative color temperature value corresponding to the ambient light parameter acquired at each acquisition time point.

The ambient relative color temperature value corresponding to the ambient light parameter acquired at each acquisition time point can be calculated by a conversion algorithm, for example:

cct=(9000*(b−r−g+c)+2300*(r−b−g+c))/(r−b−g+c), wherein cct is the ambient relative color temperature value, r, g, b are red, green, and blue of RGB color, c is red-green-blue transparency. The conversion algorithm here is not unique, so the parameters, such as "9000" and "2300", in the formula can be replaced by other parameters, which the application is not limited to.

The ambient relative color temperature value corresponding to the ambient light parameter acquired at each acquisition time point and the acquisition time can be put into a buffer region. The purpose is to maintain two arrays of the relative color temperature values and the acquisition times in the buffer region. The addition and deletion of the data in the buffer region need to be performed on two data at the same time to ensure that the samples are accurate and stable enough. The data sampling capacity is obtained by a sampling time*sampling data relaxation/reporting frequency. After the sample capacity is determined, the reporting time and the sample will be added and deleted in the buffer region. Wherein, the sample capacity of the two arrays is fixed, and each time a new sample is acquired, one sample will be deleted from the arrays to ensure that the capacity of the arrays remains unchanged. In this way, there is the same standard for calculating the ambient relative color temperature value corresponding to each acquisition time point.

Step 103: performing a weighted average process on the ambient relative color temperature value corresponding to the ambient light parameter acquired at each acquisition time point to obtain a target ambient color temperature value.

Specifically, after the ambient relative color temperature value corresponding to the ambient light parameter acquired at each acquisition time point is determined, the weighted average process is performed on the ambient relative color temperature value according to the time difference between the current time and the acquisition time, for example:

x1×(x1×0.5f+mWeightingIntercept)−x2×(x2×0.5f+mWeightingIntercept), wherein x1 can be a fixed time, such as 10 s, and x2 is the time difference between the current time and the acquisition time. Through this formula, it can be determined that the data that is closer to the current time can get a larger weight and the data that is farther from the current time can set a smaller weight.

A threshold-value control method can be set to prevent the difference of the target ambient color temperature value from being too large due to the large difference of the ambient light parameters acquired by the sensor in extreme cases (such as the rapid switching of the scene where the mobile terminal is currently located). The method may comprise:

performing a weighted average process on the ambient relative color temperature value corresponding to the ambient light parameter acquired at each acquisition time point to obtain a current ambient color temperature value;

obtaining a target historical ambient color temperature value closest to the current time, where the historical ambient color temperature value is obtained by performing a weighted average process on the ambient relative color temperature value corresponding to the ambient light parameter acquired at each historical acquisition time point;

multiplying the target historical ambient color temperature value by a first fixed value and a second fixed value respectively to obtain a first target historical ambient color temperature threshold value and a second target historical ambient color temperature threshold value;

determining the target ambient color temperature value based on the current ambient color temperature value, the first target historical ambient color temperature threshold value, and the second target historical ambient color temperature threshold value.

First, the current ambient color temperature value at the current time is calculated, then the historical ambient color temperature value which is obtained by performing the weighted average process on the ambient relative color temperature value corresponding to the ambient light parameter acquired at each historical acquisition time point is checked, the historical ambient color temperature value corresponding to the acquisition time point closest to the current time is filtered out, and then upper and lower limit values of the historical ambient color temperature threshold value is calculated by using the historical ambient color temperature value as a basis. Specifically, the historical ambient color temperature value can be multiplied by the first fixed value and the second fixed value, for example: mWarmerCctThreshold=cct×0.965f; mColderCctThreshold=cct×1.035f; wherein, mWarmerCctThreshold is the upper limit of the historical ambient color temperature threshold, mColderCctThreshold is the lower limit of the historical ambient color temperature threshold. Then, the target ambient color temperature value is determined according to the current ambient color temperature value, the first target historical ambient color temperature threshold value, and the second target historical ambient color temperature threshold value.

When the current ambient color temperature value is less than the first target historical ambient color temperature threshold value or greater than the second target historical ambient color temperature threshold value, it indicates that the surrounding scene of the mobile terminal is switched rapidly during the period from the acquisition point to the current time. In order to avoid violent variation in the data value, when the current ambient color temperature value is less than the first target historical ambient color temperature threshold value, the first target historical ambient color temperature threshold value can be determined as the target ambient color temperature value; when the current ambient color temperature value is greater than the second target historical ambient color temperature threshold value, the second target historical ambient color temperature threshold value is determined as the target ambient color temperature value.

Therefore, determining the target ambient color temperature value based on the current ambient color temperature value, the first target historical ambient color temperature threshold value and the second target historical ambient color temperature threshold value may comprise:

Determining the first target historical ambient color temperature threshold value as the target ambient color temperature value if the current ambient color temperature value is less than the first target historical ambient color temperature threshold value.

Determining the target ambient color temperature value based on the current ambient color temperature value, the first target historical ambient color temperature threshold value and the second target historical ambient color temperature threshold value may comprise:

Determining the second target historical ambient color temperature threshold value as the target ambient color temperature value if the current ambient color temperature value is greater than the second target historical ambient color temperature threshold value.

When the current ambient color temperature value is greater than the first target historical ambient color temperature threshold value and less than the second target historical ambient color temperature threshold value, it indicates that the surrounding scene of the mobile terminal is not switched rapidly during the period from the acquisition point to the current time. Thus, the current ambient color temperature value can be directly determined as the target ambient color temperature value. Accordingly, determining the target ambient color temperature value based on the current ambient color temperature value, the first target historical ambient color temperature threshold value and the second target historical ambient color temperature threshold value may further comprise:

Determine the current ambient color temperature value as the target ambient color temperature value if the current ambient color temperature value is greater than the first target historical ambient color temperature threshold value and less than the second target historical ambient color temperature threshold value.

Step 104: determining a target screen color temperature value corresponding to the target ambient color temperature value and further a current screen color temperature value.

Wherein, the target ambient color temperature value can be converted into the corresponding target screen color temperature value through a mapping algorithm. The mapping algorithm is: MAmbientCct/2+4600, where MAmbientCct is the target ambient color temperature value, and the parameters in the formula are not unique, which the application is not limited to.

Step 105: obtaining a screen color temperature value change time according to the target screen color temperature value and the current screen color temperature value and changing the color temperature value of the screen from the current screen color temperature value to the target screen color temperature value according to the screen color temperature value change time.

In order to make the current screen color temperature value of the screen of the mobile terminal to smoothly transit to the target screen color temperature value, an interpolation operation can be performed on the current screen color temperature value and the target screen color temperature value, for example: duration=(long)Math·abs(cct−lastCCT)×3, wherein duration is the screen color temperature value change time, cct is the target screen color temperature value, and lastCCT is the current screen color temperature value. After the screen color temperature value change time is calculated, the color temperature value of the screen is changed from the current screen color temperature value to the target screen color temperature value according to the screen color temperature value change time.

The screen color temperature control method provided by the embodiments of the present disclosure includes: acquiring ambient light parameters according to a preset time interval; obtaining an ambient relative color temperature value corresponding to the ambient light parameter acquired at each acquisition time point; performing a weighted average process on the ambient relative color temperature value corresponding to the ambient light parameter acquired at each acquisition time point to obtain a target ambient color temperature value; determining a target screen color temperature value corresponding to the target ambient color temperature value and further a current screen color temperature value; and obtaining a screen color temperature value change time according to the target screen color temperature value and the current screen color temperature value and changing a color temperature value of the screen from the current screen color temperature value to the target screen color temperature value according to the screen color temperature value change time. The present disclosure can avoid that a screen color temperature of a mobile terminal is directly adjusted to a larger or smaller parameter when the scene switching is great, so as to prevent the human eyes from be damaged by the screen.

Figure 2:
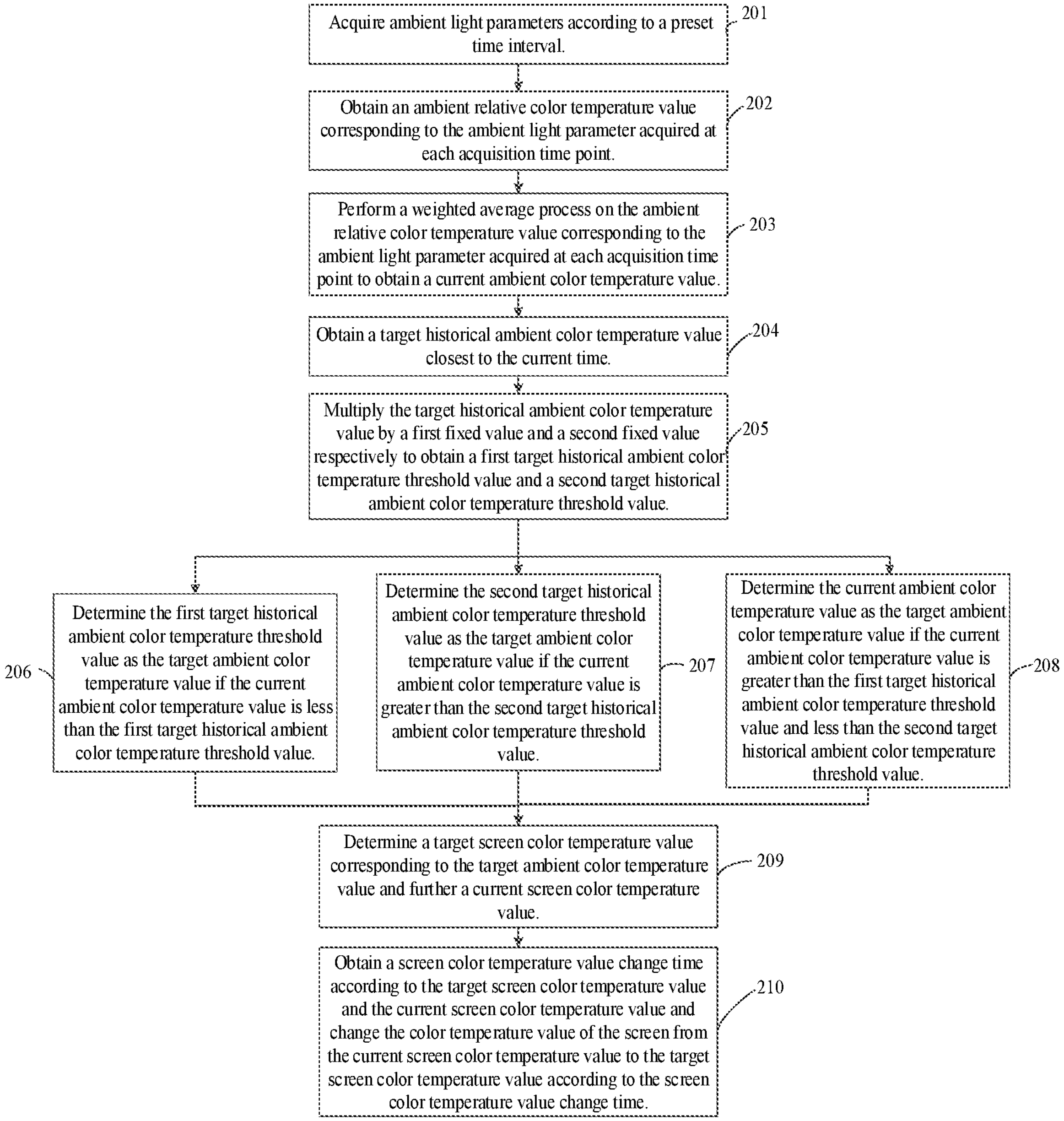
FIG. 2 is a second schematic flow chart of a screen color temperature control method according to an embodiment of the present disclosure.

FIG. 2 provides a screen color temperature control method.

Step 201: acquiring ambient light parameters according to a preset time interval.

The ambient light parameters can be acquired by an RGB sensor on a mobile terminal, wherein the mobile terminal can be a mobile phone, a tablet computer, a notebook computer, a personal digital assistant, and other devices, and a variety of application programs are stored in the mobile terminal, such as applications with entertainment functions (such as video applications, screen color temperature control applications, game applications, reading software) and applications with service functions (such as map navigation applications, catering applications, etc.).

The ambient light parameters may comprise parameters such as RGB color and RGB transparency of the ambient light in the environment where the mobile terminal is located, which the application is not limited to. The preset time interval may be 10 s, 15 s, etc., so as to acquire the ambient light parameters in the environment where the mobile terminal is located at multiple times.

Step 202: obtaining an ambient relative color temperature value corresponding to the ambient light parameter acquired at each acquisition time point.

The ambient relative color temperature value corresponding to the ambient light parameter acquired at each acquisition time point can be calculated by a conversion algorithm, for example:

$$cct=(9000*(b-r-g+c)+2300*(r-b-g+c))/(r-b-g+c),$$

wherein cct is the ambient relative color temperature value, r, g, b are red, green, and blue of RGB color, c is red-green-blue transparency. The conversion algorithm here is not unique, so the parameters, such as “9000” and “2300”, in the formula can be replaced by other parameters, which the application is not limited to.

The ambient relative color temperature value corresponding to the ambient light parameter acquired at each acquisition time point and the acquisition time can be put into a buffer region. The purpose is to maintain two arrays of the relative color temperature values and the acquisition times in the buffer region. The addition and deletion of the data in the buffer region need to be performed on two data at the same time to ensure that the samples are accurate and stable enough. Specifically, the data sampling capacity is obtained by a sampling time*sampling data relaxation/reporting frequency. After the sample capacity is determined, the reporting time and the sample will be added and deleted in the buffer region.

Step 203: performing a weighted average process on the ambient relative color temperature value corresponding to the ambient light parameter acquired at each acquisition time point to obtain a current ambient color temperature value.

Specifically, after the ambient relative color temperature value corresponding to the ambient light parameter acquired at each acquisition time point is determined, the weighted average process is performed on the ambient relative color temperature value according to the time difference between the current time and the acquisition time, 1×(x1×0.5f+mWeightingIntercept)−x2×(x2×0.5f+mWeightingIntercept), wherein x1 can be a fixed time, such as 10 s, and x2 is the time difference between the current time and the acquisition time. Through this formula, it can be determined that the data that is closer to the current time can get a larger weight and the data that is farther from the current time can set a smaller weight.

A threshold-value control method can be set to prevent difference of a target ambient color temperature value from being too large due to the large difference of the ambient light parameters acquired by the sensor in extreme cases (such as the rapid switching of the scene where the mobile terminal is currently located)

Step 204: obtaining a target historical ambient color temperature value closest to the current time.

First, the current ambient color temperature value at the current time is calculated, then the historical ambient color temperature value which is obtained by performing the weighted average process on the ambient relative color temperature value corresponding to the ambient light parameter acquired at each historical acquisition time point is checked, and the historical ambient color temperature value corresponding to the acquisition time point closest to the current time is filtered out.

Step 205: multiplying the target historical ambient color temperature value by a first fixed value and a second fixed value respectively to obtain a first target historical ambient color temperature threshold value and a second target historical ambient color temperature threshold value.

Upper and lower limit values of the historical ambient color temperature threshold value is calculated by using the historical ambient color temperature value as a basis. For example: mWarmerCctThreshold=cct×0.965f; mColderCctThreshold=cct×1.035f; wherein, mWarmerCctThreshold is the upper limit of the historical ambient color temperature threshold, mColderCctThreshold is the lower limit of the historical ambient color temperature threshold. Then, the target ambient color temperature value is determined according to the current ambient color temperature value, the first target historical ambient color temperature threshold value, and the second target historical ambient color temperature threshold value.

Step 206: determining the first target historical ambient color temperature threshold value as the target ambient color temperature value if the current ambient color temperature value is less than the first target historical ambient color temperature threshold value.

When the current ambient color temperature value is less than the first target historical ambient color temperature threshold value or greater than the second target historical ambient color temperature threshold value, it indicates that the surrounding scene of the mobile terminal is switched rapidly during the period from the acquisition point to the current time. In order to avoid violent variation in the data value, when the current ambient color temperature value is less than the first target historical ambient color temperature threshold value, the first target historical ambient color temperature threshold value can be determined as the target ambient color temperature value; when the current ambient color temperature value is greater than the second target historical ambient color temperature threshold value, the second target historical ambient color temperature threshold value is determined as the target ambient color temperature value.

Step 207: determining the second target historical ambient color temperature threshold value as the target ambient color temperature value if the current ambient color temperature value is greater than the second target historical ambient color temperature threshold value.

Step 208: determining the current ambient color temperature value as the target ambient color temperature value if the current ambient color temperature value is greater than the first target historical ambient color temperature threshold value and less than the second target historical ambient color temperature threshold value.

When the current ambient color temperature value is greater than the first target historical ambient color temperature threshold value and less than the second target historical ambient color temperature threshold value, it indicates that the surrounding scene of the mobile terminal is not switched rapidly during the period from the acquisition point to the current time. Thus, the current ambient color temperature value can be directly determined as the target ambient color temperature value.

Step 209: determining a target screen color temperature value corresponding to the target ambient color temperature value and further a current screen color temperature value.

The target ambient color temperature value can be converted into the corresponding target screen color temperature value through a mapping algorithm. The mapping algorithm is: MAmbientCct/2+4600, wherein MAmbientCct is the target ambient color temperature value, and the parameters in the formula are not unique, which the application is not limited to.

Step 210: obtaining a screen color temperature value change time according to the target screen color temperature value and the current screen color temperature value and changing the color temperature value of the screen from the current screen color temperature value to the target screen color temperature value according to the screen color temperature value change time.

Specifically, in order to make the current screen color temperature value of the screen of the mobile terminal to smoothly transit to the target screen color temperature value, an interpolation operation can be performed on the current screen color temperature value and the target screen color temperature value, for example: duration=(long)Math·abs (cct−lastCCT)×3, wherein duration is the screen color temperature value change time, cct is the target screen color temperature value, and lastCCT is the current screen color temperature value. After the screen color temperature value change time is calculated, the color temperature value of the screen is changed from the current screen color temperature value to the target screen color temperature value according to the screen color temperature value change time.

The screen color temperature control method provided by the embodiments of the present disclosure includes: acquiring ambient light parameters according to a preset time interval; obtaining an ambient relative color temperature value corresponding to the ambient light parameter acquired at each acquisition time point; performing a weighted average process on the ambient relative color temperature value corresponding to the ambient light parameter acquired at each acquisition time point to obtain a target ambient color temperature value; determining a target screen color temperature value corresponding to the target ambient color temperature value and further a current screen color temperature value; and obtaining a screen color temperature value change time according to the target screen color temperature value and the current screen color temperature value and changing a color temperature value of the screen from the current screen color temperature value to the target screen color temperature value according to the screen color temperature value change time. The present disclosure can avoid that a screen color temperature of a mobile terminal is directly adjusted to a larger or smaller parameter when the scene switching is great, so as to prevent the human eyes from be damaged by the screen.

Figure 3:
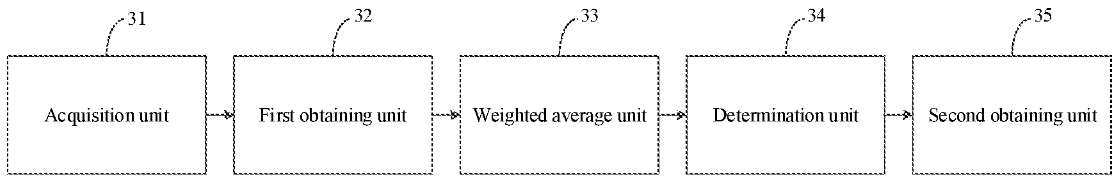
FIG. 3 is a schematic structural diagram of a screen color temperature control device according to an embodiment of the present disclosure.

FIG. 3 is a schematic structural diagram of a screen color temperature control device according to an embodiment of the present disclosure. The screen color temperature control device comprises: an acquisition unit 31, a first obtaining unit 32, a weighted average unit 33, a determination unit 34, and a second obtaining unit 35.

The acquisition unit 31 is configured to acquire ambient light parameters according to a preset time interval.

The ambient light parameters can be acquired by an RGB sensor on a mobile terminal, wherein the mobile terminal can be a mobile phone, a tablet computer, a notebook computer, a personal digital assistant, and other devices, and a variety of application programs are stored in the mobile terminal, such as applications with entertainment functions (such as video applications, screen color temperature control applications, game applications, reading software) and applications with service functions (such as map navigation applications, catering applications, etc.).

The ambient light parameters may comprise parameters such as RGB color and RGB transparency of the ambient light in the environment where the mobile terminal is located, which the application is not limited to. The preset time interval may be 10 s, 15 s, etc., so as to acquire the ambient light parameters in the environment where the mobile terminal is located at multiple times.

The first obtaining unit 32 is configured to obtain an ambient relative color temperature value corresponding to the ambient light parameter acquired at each acquisition time point.

Specifically, the ambient relative color temperature value corresponding to the ambient light parameter acquired at each acquisition time point can be calculated by a conversion algorithm, for example:

cct=(9000*(b−r−g+c)+2300*(r−b−g+c))/(r−b−g+c), wherein cct is the ambient relative color temperature value, r, g, b are red, green, and blue of RGB color, c is red-green-blue transparency. The conversion algorithm here is not unique, so the parameters, such as "9000" and "2300", in the formula can be replaced by other parameters, which the application is not limited to.

The ambient relative color temperature value corresponding to the ambient light parameter acquired at each acquisition time point and the acquisition time can be put into a buffer region. The purpose is to maintain two arrays of the relative color temperature values and the acquisition times in the buffer region. The addition and deletion of the data in the buffer region need to be performed on two data at the same time to ensure that the samples are accurate and stable enough. The data sampling capacity is obtained by a sampling time*sampling data relaxation/reporting frequency. After the sample capacity is determined, the reporting time and the sample will be added and deleted in the buffer region.

The weighted average unit 33 is configured to perform a weighted average process on the ambient relative color temperature value corresponding to the ambient light parameter acquired at each acquisition time point to obtain a target ambient color temperature value.

After the ambient relative color temperature value corresponding to the ambient light parameter acquired at each acquisition time point is determined, the weighted average process is performed on the ambient relative color temperature value according to the time difference between the current time and the acquisition time, for example:

x1×(x1×0.5f+mWeightingIntercept)−x2×(x2×0.5f+mWeightingIntercept), wherein x1 can be a fixed time, such as 10 s, and x2 is the time difference between the current time and the acquisition time. Through this formula, it can be determined that the data that is closer to the current time can get a larger weight and the data that is farther from the current time can set a smaller weight.

The determination unit 34 is configured to determine a target screen color temperature value corresponding to the target ambient color temperature value and further a current screen color temperature value.

The target ambient color temperature value can be converted into the corresponding target screen color temperature value through a mapping algorithm. The mapping algorithm is: MAmbientCct/2+4600, wherein MAmbientCct is the target ambient color temperature value, and the parameters in the formula are not unique, which the application is not limited to.

The second obtaining unit 35 is configured to obtain a screen color temperature value change time according to the target screen color temperature value and the current screen color temperature value and change the color temperature value of the screen from the current screen color temperature value to the target screen color temperature value according to the screen color temperature value change time.

In order to make the current screen color temperature value of the screen of the mobile terminal to smoothly transit to the target screen color temperature value, an interpolation operation can be performed on the current screen color temperature value and the target screen color temperature value, for example: duration=(long)Math·abs(cct−lastCCT)×3, wherein duration is the screen color temperature value change time, cct is the target screen color temperature value, and lastCCT is the current screen color temperature value. After the screen color temperature value change time is calculated, the color temperature value of the screen is changed from the current screen color temperature value to the target screen color temperature value according to the screen color temperature value change time.

In some embodiments, the weighted average unit 33 further comprises:

a weighted average sub-unit configured to perform a weighted average process on the ambient relative color temperature value corresponding to the ambient light parameter acquired at each acquisition time point to obtain a current ambient color temperature value;

an obtaining sub-unit configured to obtain a target historical ambient color temperature value closest to the current time, wherein the historical ambient color temperature value is obtained by performing a weighted average process on the ambient relative color temperature value corresponding to the ambient light parameter acquired at each historical acquisition time point.

a calculation sub-unit configured to multiply the target historical ambient color temperature value by a first fixed value and a second fixed value respectively to obtain a first target historical ambient color temperature threshold value and a second target historical ambient color temperature threshold value;

a determination sub-unit configured to determine the target ambient color temperature value based on the current ambient color temperature value, the first target historical ambient color temperature threshold value, and the second target historical ambient color temperature threshold value.

In some embodiments, specifically, the determination sub-unit is configured to determine the first target historical ambient color temperature threshold value as the target ambient color temperature value if the current ambient color temperature value is less than the first target historical ambient color temperature threshold value.

Based on the above method, the invention further provide a storage medium where a plurality of instructions are stored, wherein a processor is adapted to load the instructions and perform the screen color temperature control method as described above.

One of ordinary skill in the art can understand that all or part of the steps in the various methods of the above embodiments can be completed by instructing relevant hardware through a program. The program can be stored in a computer-readable storage medium. The storage medium may comprise: a Read Only Memory (ROM), Random Access Memory (RAM), magnetic disk, or optical disk, etc.

An embodiment of the present disclosure further provides a mobile terminal. The mobile terminal comprises a processor and a memory. The memory stores a computer program. The processor is used to perform the screen color temperature control method by calling the computer program stored in the memory. The method includes:

acquiring ambient light parameters according to a preset time interval;

obtaining an ambient relative color temperature value corresponding to the ambient light parameter acquired at each acquisition time point;

performing a weighted average process on the ambient relative color temperature value corresponding to the ambient light parameter acquired at each acquisition time point to obtain a target ambient color temperature value; and determining a target screen color temperature value corresponding to the target ambient color temperature value and further a current screen color temperature value; and obtaining a screen color temperature value change time according to the target screen color temperature value and the current screen color temperature value and changing a color temperature value of the screen from the current screen color temperature value to the target screen color temperature value according to the screen color temperature value change time, wherein the ambient light parameters comprise RGB color and RGB transparency of the ambient light in an environment where the mobile terminal is located.

Furthermore, the performing a weighted average process on the ambient relative color temperature value corresponding to the ambient light parameter acquired at each acquisition time point to obtain a target ambient color temperature value comprises:

performing a weighted average process on the ambient relative color temperature value corresponding to the ambient light parameter acquired at each acquisition time point to obtain a current ambient color temperature value;

obtaining a target historical ambient color temperature value closest to a current time, wherein the historical ambient color temperature value is obtained by performing a weighted average process on the ambient relative color temperature value corresponding to the ambient light parameter acquired at each historical acquisition time point;

multiplying the target historical ambient color temperature value by a first fixed value and a second fixed value respectively to obtain a first target historical ambient color temperature threshold value and a second target historical ambient color temperature threshold value;

determining the target ambient color temperature value based on the current ambient color temperature value, the first target historical ambient color temperature threshold value, and the second target historical ambient color temperature threshold value.

Furthermore, the determining the target ambient color temperature value based on the current ambient color temperature value, the first target historical ambient color temperature threshold value, and the second target historical ambient color temperature threshold value comprises:

determining the first target historical ambient color temperature threshold value as the target ambient color temperature value if the current ambient color temperature value is less than the first target historical ambient color temperature threshold value.

Furthermore, the determining the target ambient color temperature value based on the current ambient color temperature value, the first target historical ambient color temperature threshold value, and the second target historical ambient color temperature threshold value comprises:

determining the second target historical ambient color temperature threshold value as the target ambient color temperature value if the current ambient color temperature value is greater than the second target historical ambient color temperature threshold value.

Furthermore, the determining the target ambient color temperature value based on the current ambient color temperature value, the first target historical ambient color temperature threshold value, and the second target historical ambient color temperature threshold value comprises:

determining the current ambient color temperature value as the target ambient color temperature value if the current ambient color temperature value is greater than the first target historical ambient color temperature threshold value and less than the second target historical ambient color temperature threshold value.

Figure 4:
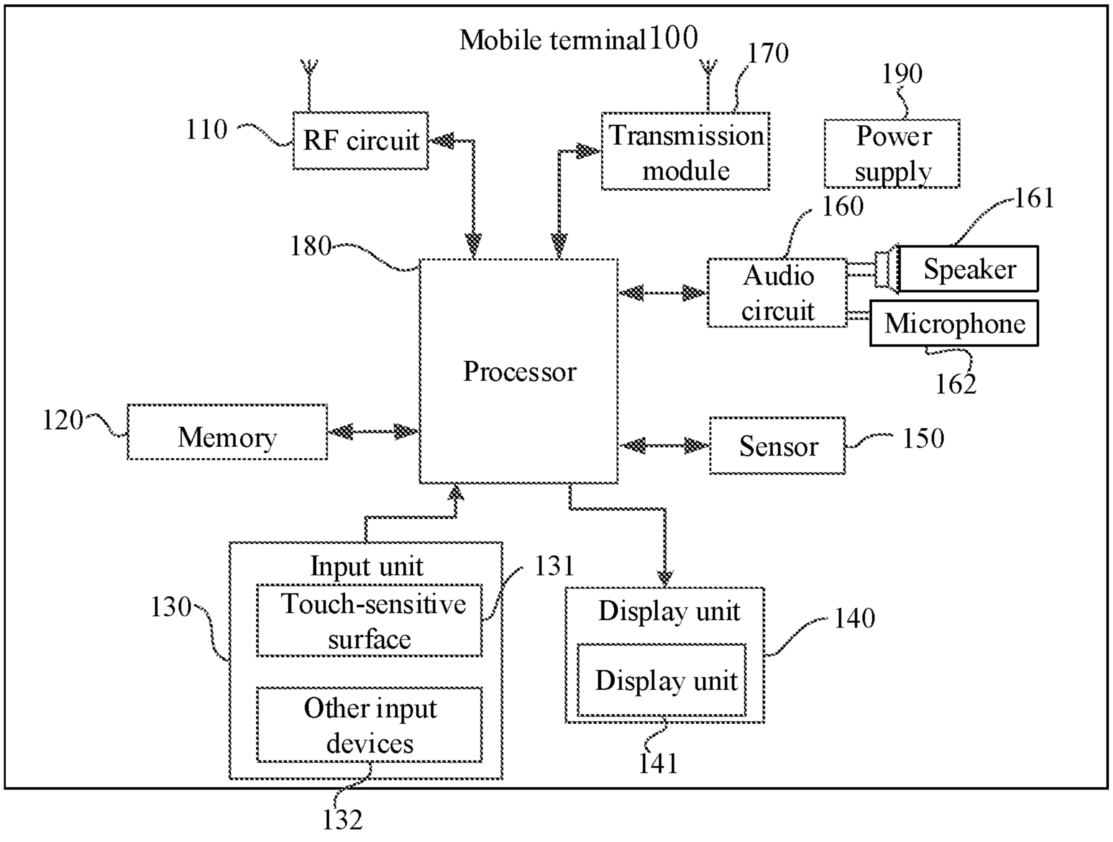
FIG. 4 is a specific structural diagram of a mobile terminal according to an embodiment of the present disclosure.

FIG. 4 shows a block diagram of a terminal provided by an embodiment of the present invention. The terminal can be used to implement the screen color temperature control method, storage medium, and terminal provided in the foregoing embodiments.

As shown in FIG. 4, a mobile terminal 1200 may comprise a Radio Frequency (RF) circuit 110, a memory 120 comprising one or more (only one is shown in the figure) computer-readable storage medium, an input unit 130, a display unit 140, a sensor 150, an audio circuit 160, a transmission module 170, a processor 180 comprising one or more (only one is shown in the figure) processing core, a power supply 190, and other components.

The RF circuit 110 may be configured to receive and send a signal during an information receiving and sending process or a conversation process. Specifically, after receiving downlink information from a base station, the RF circuit 110 delivers the downlink information to one or more processors 880 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the memory 120 may include a high speed random access memory, and may also include a non-volatile memory, such as at least one magnetic disk memory, a flash memory device, or another volatile solid-state memory. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface and other input device. The touch-sensitive surface may also be referred to as a touch screen or a touch panel, and may collect a touch operation of a user on or near the touch-sensitive surface (such as an operation of a user on or near the touch-sensitive surface by using any suitable object or attachment, such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface may be implemented by using various types, such as a resistive type, a capacitance type, an infrared type, and a surface sound wave type. In addition to the touch-sensitive surface, the input unit 130 may further include the another input device. Specifically, the another input device may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the mobile terminal. The graphical user ports may be formed by a graph, a text, an icon, a video, and any combination thereof. The display unit 140 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 180, so as to determine a type of a touch event. Then, the processor 180 provides corresponding visual output on the display panel according to the type of the touch event. Although, in FIG. 8, the touch-sensitive surface and the display panel are used as two separate parts to implement input and output functions, in some embodiments, the touch-sensitive surface and the display panel may be integrated to implement the input and output functions.

The mobile terminal may further include at least one sensor 150, such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the mobile terminal is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the mobile terminal are not further described herein.

The audio circuit 160, a speaker 161, and a microphone 162 may provide audio interfaces between the user and the mobile terminal. The audio circuit 160 may transmit, to the speaker 161, a received electric signal converted from received audio data. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the mobile terminal.

The mobile terminal may help, by using the transmission module 170 (e.g. Wi-Fi module), a user to receive and send an e-mail, browse a webpage, and access stream media, and the like, which provides wireless broadband Internet access for the user. Although FIG. 8 shows the transmission module 170, it may be understood that, the wireless communications unit is not a necessary component of the mobile terminal, and can be ignored according to demands without changing the scope of the essence of the present disclosure.

The processor 180 is a control center of the mobile terminal, and connects various parts of the terminal by using various interfaces and lines. By running or executing the software program and/or module stored in the memory 120, and invoking data stored in the memory 120, the processor 180 performs various functions and data processing of the mobile terminal, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The mobile terminal further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown, the mobile terminal 1200 may further comprise a camera (such as, a front camera, a rear camera), a Bluetooth module, and the like, which will not be described in detail.

The display unit 140 of the mobile terminal 1200 is a touch screen display. The mobile terminal 1200 also comprises the memory 120 and one or more programs, wherein the one or more programs are stored in the memory 120 and are configured to be executed by the one or more processors 180 to perform the operations of:

acquiring ambient light parameters according to a preset time interval;

obtaining an ambient relative color temperature value corresponding to the ambient light parameter acquired at each acquisition time point;

performing a weighted average process on the ambient relative color temperature value corresponding to the ambient light parameter acquired at each acquisition time point to obtain a target ambient color temperature value; and determining a target screen color temperature value corresponding to the target ambient color temperature value and further a current screen color temperature value; and obtaining a screen color temperature value change time according to the target screen color temperature value and the current screen color temperature value and changing a color temperature value of the screen from the current screen color temperature value to the target screen color temperature value according to the screen color temperature value change time, wherein the ambient light parameters comprise RGB color and RGB transparency of the ambient light in an environment where the mobile terminal is located.

In some embodiments, the operation of performing a weighted average process on the ambient relative color temperature value corresponding to the ambient light parameter acquired at each acquisition time point to obtain a target ambient color temperature value comprises:

performing a weighted average process on the ambient relative color temperature value corresponding to the ambient light parameter acquired at each acquisition time point to obtain a current ambient color temperature value;

obtaining a target historical ambient color temperature value closest to a current time, wherein the historical ambient color temperature value is obtained by performing a weighted average process on the ambient relative color temperature value corresponding to the ambient light parameter acquired at each historical acquisition time point;

multiplying the target historical ambient color temperature value by a first fixed value and a second fixed value respectively to obtain a first target historical ambient color temperature threshold value and a second target historical ambient color temperature threshold value;

determining the target ambient color temperature value based on the current ambient color temperature value, the first target historical ambient color temperature threshold value, and the second target historical ambient color temperature threshold value.

In some embodiments, the operation of determining the target ambient color temperature value based on the current ambient color temperature value, the first target historical ambient color temperature threshold value, and the second target historical ambient color temperature threshold value comprises:

determining the first target historical ambient color temperature threshold value as the target ambient color temperature value if the current ambient color temperature value is less than the first target historical ambient color temperature threshold value.

In some embodiments, the operation of determining the target ambient color temperature value based on the current ambient color temperature value, the first target historical ambient color temperature threshold value, and the second target historical ambient color temperature threshold value comprises:

determining the second target historical ambient color temperature threshold value as the target ambient color temperature value if the current ambient color temperature value is greater than the second target historical ambient color temperature threshold value.

In some embodiments, the operation of determining the target ambient color temperature value based on the current ambient color temperature value, the first target historical ambient color temperature threshold value, and the second target historical ambient color temperature threshold value comprises:

determining the current ambient color temperature value as the target ambient color temperature value if the current ambient color temperature value is greater than the first target historical ambient color temperature threshold value and less than the second target historical ambient color temperature threshold value.

The principles and implementations of the present disclosure are described herein by using specific examples, and the descriptions of the above embodiments are only used to help to understand the technical solutions and core ideas of the present disclosure. One of ordinary skill in the art should understand that the technical solutions described in the foregoing embodiments can be modified, or some of the technical features can be replaced equivalently. The modification or replacement does not make the essence of the corresponding technical solutions depart from the scope of the technical solutions of the embodiments of the present disclosure.

What is claimed is:

1. A method of controlling screen color temperature comprising:

acquiring ambient light parameters according to a preset time interval;

obtaining an ambient relative color temperature value corresponding to the ambient light parameter acquired at each acquisition time point;

performing a weighted average process on the ambient relative color temperature value corresponding to the ambient light parameter acquired at each acquisition time point to obtain a current ambient color temperature value;

obtaining a target historical ambient color temperature value closest to a current time, wherein the historical ambient color temperature value is obtained by performing a weighted average process on the ambient relative color temperature value corresponding to the ambient light parameter acquired at each historical acquisition time point;

multiplying the target historical ambient color temperature value by a first fixed value and a second fixed value respectively to obtain a first target historical ambient color temperature threshold value and a second target historical ambient color temperature threshold value;

determining a target ambient color temperature value based on the current ambient color temperature value, the first target historical ambient color temperature threshold value, and the second target historical ambient color temperature threshold value;

determining a target screen color temperature value corresponding to the target ambient color temperature value and further a current screen color temperature value; and obtaining a screen color temperature value change time according to the target screen color temperature value and the current screen color temperature value and changing a color temperature value of the screen from the current screen color temperature value to the target screen color temperature value according to the screen color temperature value change time.

2. The method of claim 1, wherein the determining the target ambient color temperature value based on the current ambient color temperature value, the first target historical ambient color temperature threshold value, and the second target historical ambient color temperature threshold value comprises:

determining the first target historical ambient color temperature threshold value as the target ambient color temperature value if the current ambient color temperature value is less than the first target historical ambient color temperature threshold value.

3. The method of claim 1, wherein the determining the target ambient color temperature value based on the current ambient color temperature value, the first target historical ambient color temperature threshold value, and the second target historical ambient color temperature threshold value comprises:

determining the second target historical ambient color temperature threshold value as the target ambient color temperature value if the current ambient color temperature value is greater than the second target historical ambient color temperature threshold value.

4. The method of claim 1, wherein the determining the target ambient color temperature value based on the current ambient color temperature value, the first target historical ambient color temperature threshold value, and the second target historical ambient color temperature threshold value comprises:

determining the current ambient color temperature value as the target ambient color temperature value if the current ambient color temperature value is greater than the first target historical ambient color temperature threshold value and less than the second target historical ambient color temperature threshold value.

5. A mobile terminal comprising:

a processor; and a memory, storing computer program instructions executed by the processor to perform operations comprising:

acquiring ambient light parameters according to a preset time interval;

obtaining an ambient relative color temperature value corresponding to the ambient light parameter acquired at each acquisition time point;

performing a weighted average process on the ambient relative color temperature value corresponding to the ambient light parameter acquired at each acquisition time point to obtain a current ambient color temperature value;

obtaining a target historical ambient color temperature value closest to a current time, wherein the historical ambient color temperature value is obtained by performing a weighted average process on the ambient relative color temperature value corresponding to the ambient light parameter acquired at each historical acquisition time point;

multiplying the target historical ambient color temperature value by a first fixed value and a second fixed value respectively to obtain a first target historical ambient color temperature threshold value and a second target historical ambient color temperature threshold value;

determining a target ambient color temperature value based on the current ambient color temperature value, the first target historical ambient color temperature threshold value, and the second target historical ambient color temperature threshold value;

determining a target screen color temperature value corresponding to the target ambient color temperature value and further a current screen color temperature value; and obtaining a screen color temperature value change time according to the target screen color temperature value and the current screen color temperature value and changing a color temperature value of the screen from the current screen color temperature value to the target screen color temperature value according to the screen color temperature value change time, wherein the ambient light parameters comprise RGB color and RGB transparency of the ambient light in an environment where the mobile terminal is located.

6. The mobile terminal of claim 5, wherein the determining the target ambient color temperature value based on the current ambient color temperature value, the first target historical ambient color temperature threshold value, and the second target historical ambient color temperature threshold value comprises:

determining the first target historical ambient color temperature threshold value as the target ambient color temperature value if the current ambient color temperature value is less than the first target historical ambient color temperature threshold value.

7. The mobile terminal of claim 5, wherein the determining the target ambient color temperature value based on the current ambient color temperature value, the first target historical ambient color temperature threshold value, and the second target historical ambient color temperature threshold value comprises:

determining the second target historical ambient color temperature threshold value as the target ambient color temperature value if the current ambient color temperature value is greater than the second target historical ambient color temperature threshold value.

8. The mobile terminal of claim 5, wherein the determining the target ambient color temperature value based on the current ambient color temperature value, the first target historical ambient color temperature threshold value, and the second target historical ambient color temperature threshold value comprises:

determining the current ambient color temperature value as the target ambient color temperature value if the current ambient color temperature value is greater than the first target historical ambient color temperature threshold value and less than the second target historical ambient color temperature threshold value.

* * * * *